(12) United States Patent
Okajima et al.

(10) Patent No.: US 7,617,720 B2
(45) Date of Patent: Nov. 17, 2009

(54) SURFACE POSITION MEASURING METHOD AND SURFACE POSITION MEASURING DEVICE

(75) Inventors: Takaharu Okajima, Sapporo (JP); Masaru Tanaka, Sendai (JP); Hiroshi Tokumoto, Sapporo (JP)

(73) Assignee: National University Corporation Hokkaido University, Hokkaido (JP)

( * ) Notice: Subject to any disclaimer, the term of this patent is extended or adjusted under 35 U.S.C. 154(b) by 143 days.

(21) Appl. No.: 11/794,761

(22) PCT Filed: Dec. 22, 2005

(86) PCT No.: PCT/JP2005/023633

§ 371 (c)(1), (2), (4) Date: Jul. 5, 2007

(87) PCT Pub. No.: WO2006/073068

PCT Pub. Date: Jul. 13, 2006

(65) Prior Publication Data

US 2008/0092640 A1 Apr. 24, 2008

(30) Foreign Application Priority Data

Jan. 6, 2005 (JP) ............................. 2005-001538

(51) Int. Cl.
G12B 21/08 (2006.01)

(52) U.S. Cl. .......................................... 73/105; 850/38

(58) Field of Classification Search .................... 73/105, 73/862.634; 850/38
See application file for complete search history.

(56) References Cited

U.S. PATENT DOCUMENTS 5,804,709 A * 9/1998 Bourgoin et al. ............... 73/105
6,694,817 B2 * 2/2004 Degertekin et al. ............. 73/661
6,779,387 B2 * 8/2004 Degertekin .................... 73/105
7,107,825 B2 * 9/2006 Degertekin et al. ............ 73/105

OTHER PUBLICATIONS

Binnig, G. et al., "Atomic Force Microscope", *Physical Review Letters*, vol. 56, No. 9, pp. 930-933, (Mar. 3, 1986).
Rotsch, C. et al., "Dimensional and mechanical dynamics of active and stable edges in motile fibroblasts investigated by using atomic force microscopy",*Proc. Natl. Acad. Sci. USA*, vol. 96, pp. 921-926, (Feb. 1999).
Hutter, L. et al., "Calibration of atomic-force microscope tips", *Rev. Sci. Instrum.*, vol. 64, pp. 1868-1873, (Jul. 1993).
Roters, A. et al., "Static and dynamic profiles of tethered polmer layers probed by analyzing the noise of an atomic force microscope", *Physical Review E*, vol. 56, No. 3, pp. 3256-3264, (Sep. 1997).

* cited by examiner

*Primary Examiner*—Hezron Williams
*Assistant Examiner*—Rodney T Frank
(74) *Attorney, Agent, or Firm*—The Nath Law Group; Jerald L. Meyer; Stanley N. Protigal

(57) ABSTRACT

A surface position measuring method capable of measuring a position on a soft surface accurately and rapidly (real time), with low invasiveness. The method comprises the steps of measuring the spectrum of thermal oscillation of a cantilever with the distance between a cantilever tip and a sample surface being changed, extracting a fundamental mode component (spectrum area) from the obtained spectrum of thermal oscillation, and measuring a change in the spectrum area of thermal oscillation (spectrum area) with respect to the distance. A position at which the area of the cantilever thermal oscillation spectrum begins to change is evaluated as a position on the sample surface.

6 Claims, 5 Drawing Sheets

SURFACE POSITION MEASURING METHOD AND SURFACE POSITION MEASURING DEVICE

TECHNICAL FIELD

The present invention relates to a surface position measuring method and surface position measuring apparatus, and more particularly to a surface position measuring method and surface position measuring apparatus using an atomic force microscope.

BACKGROUND ART

The atomic force microscope (AFM) developed in 1986 (Non-patent Document 1) is a microscope that can perform high-resolution observation of the surface topography of conductors, semiconductors, and insulators (including polymers and biomaterials). In an atomic force microscope, a pointed protrusion (tip) is attached to the end of an extremely pliable lever called a cantilever, and when this tip is brought in proximity to a sample, a very weak force generated between the sample surface and the tip can be measured via deflection of the cantilever. Unless specified otherwise, in this description the term "cantilever" is used in a broad sense that includes the tip.

When the sample surface is sufficiently soft compared with the stiffness of the cantilever of an atomic force microscope, the displacement (deflection) of the cantilever is small even though the tip comes into contact with the surface. Therefore it is difficult to measure a surface position accurately from the amount of static displacement of the tip. For example, since the lipid membrane of a cell surface is extremely soft and fluctuates with a large amplitude of several tens of nm, and its elasticity is quite small compared with a pliable cantilever normally used, it is not easy to accurately measure an elastic response or surface position of the only lipid membrane in a minimally invasive manner with an AFM.

One method of deriving a soft surface position (contact point) is to calculate the surface position from the shape of a force curve when the tip is pressed forcefully against the surface (Non-patent Document 2). Here, the force curve is a curve obtained by plotting the distance between the tip and the sample surface on the horizontal axis, and the amount of the cantilever displacement (normally, static displacement) on the vertical axis.

On the other hand, the cantilever is subject to thermal oscillation, the amplitude of which depends on the stiffness of the cantilever, but is generally on the order of 1 nm or less. Methods of utilizing the thermal oscillation of the cantilever are to estimate a spring constant of the cantilever from measurement of the spectrum of thermal oscillation (Non-patent Document 3) or to measure the interaction between the surface and the tip from the measurement of the spectrum of thermal oscillation in non-contact area (Non-patent Document 4). Non-patent Document 1: G. Binnig, C. F. Quate, and Ch. Gerber, "Atomic Force Microscope", Phys. Rev. Lett. Vol. 56, p. 930 (1986)

Non-patent Document 2: C. Rotsch, K. Jacobson, and M. Radmacher, "Dimensional and mechanical dynamics of active and stable edges in motile fibroblasts investigated by using atomic force microscopy", Proc. Natl. Acad. Sci. USA, Vol. 96, p. 921 (1999)

Non-patent Document 3: J. L. Hutter, J. Bechhoefer, "Calibration of atomic-force microscopetips", Rev. Sci. Instrum. Vol. 64, p. 1868 (1993)

Non-patent Document 4: A. Roters, M. Gelbert, M. Schimmel, J. Ruhe, and D. Johannsmann, "Static and dynamic profiles of tethered polymer layers tipd by analyzing the noise of an atomic force microscope", Phys. Rev. E Vol. 56 p. 3256 (1997)

DISCLOSURE OF THE INVENTION

Problems to be Solved by the Invention

However, with the method of deriving a soft surface position (contact point) by calculating the surface position from the shape of the force curve when the tip is pressed forcefully against the surface, there is a certain limit to the accuracy of surface position measurement. The reason for this is that, to take the example of a cell membrane, various kinds of substances such as a cytoskeleton are present on the rear side of the cell membrane, and while it is foreseen that the elastic characteristics of these substances, as well as the cell membrane, will be included in the measurement result when the tip is pressed forcefully against the surface. Analysis that takes such influences into consideration is not easy. Also, since the procedure for evaluating a contact point is to first press the tip forcefully against the surface and then analyze the curve, the position at which contact is made cannot be determined instantaneously (in real time).

As described above, the lipid membrane of a cell surface, for example, is extremely soft, and it is considered to be difficult to measure the elastic response of the lipid membrane alone by an AFM. However, if it becomes possible to measure a contact point accurately, it is expected that local measurement of the viscoelasticity of a biomembrane itself will be possible, and accurate dynamic measurement of a glycoprotein in the cell membrane will be possible. Also, if it becomes possible to measure the contact point in real time, it is furthermore expected to be possible to perform fast and accurate 2-dimensional mapping of an extremely soft surface, and to perform accurate spatiotemporal measurement of interaction between molecules on the surface and the tip.

As explained later herein, the present invention is a method of measuring a contact position from the dynamic behavior (thermal oscillation) of a cantilever rather than performing conventional static dynamic measurement. Thermal oscillation of the cantilever is unavoidable oscillation, and of minimal oscillation amplitude. And therefore, with the thermal oscillation of the cantilever the contact position could be measured most accurately, and the damage of the surface could be minimized. However, heretofore there have been no examples of the use of a spectrum of thermal oscillation for contact position measurement, and no study whatsoever has been conducted into whether or not the spectrum of thermal oscillation responds sensitively when a tip comes into contact with an extremely soft surface (such as a cell membrane).

The object of the present invention is to provide a surface position measuring method and surface position measuring apparatus capable of measuring a position of a soft surface accurately and rapidly (in real time), in a minimally invasive manner.

Means for Solving the Problems

The present invention has a detection step of detecting a quantity relating to thermal oscillation of a cantilever, and an evaluation step of evaluating a position of a sample surface based on change of the detected quantity relating to thermal oscillation of the cantilever.

ADVANTAGEOUS EFFECT OF THE INVENTION

According to the present invention, a position of a soft surface can be measured accurately and rapidly (in real time), in a minimally invasive manner.

BEST MODE FOR CARRYING OUT THE INVENTION

Figure 1:
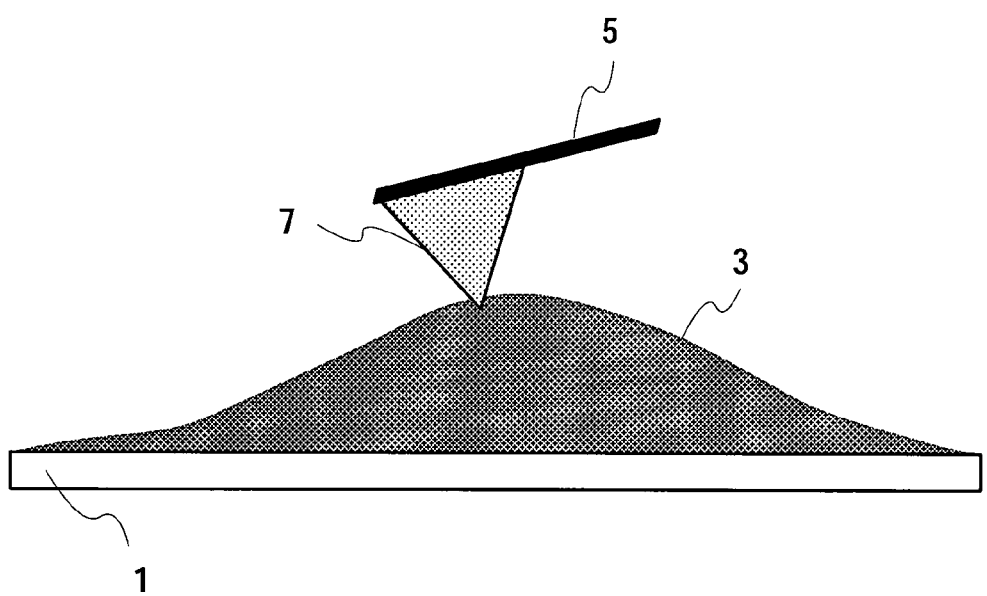
FIG. 1 is a drawing showing a schematic representation of measurement of a position of a cell surface.

Hereinafter an embodiment of the present invention will be concretely described in detail with reference to the accompanying drawings.

The present inventors found that, in order to measure a position of a soft surface accurately, it is necessary to focus on the dynamic behavior (thermal oscillation) of the cantilever rather than using conventional static dynamic measurement. That is to say, the present inventors found that, since thermal oscillation of the cantilever is unavoidable oscillation, and of minimal oscillation amplitude, with the thermal oscillation of the cantilever the contact position can be measured most accurately. And it confirmed experimentally that the spectrum of thermal oscillation responds sensitively when the cantilever comes into contact with a soft surface.

As to the present invention, a quantity relating to thermal oscillation of a cantilever is detected, and a position of a sample surface is evaluated based on change of a detected quantity relating to the thermal oscillation of the cantilever.

The term used in this description will now be explained.

"Force curve measurement" is measurement from plotting where the distance between a cantilever and a sample is on the horizontal axis and displacement (normally, static displacement) of the cantilever is on the vertical axis.

"Power spectrum" represents the squares of amplitudes of arbitrary time-series data as a spectrum, particularly, when displacement of thermal oscillation of the cantilever is used as time-series data, the squares of amplitudes of such displacement of thermal oscillation are called a "spectrum of thermal oscillation." The area of a spectrum of thermal oscillation is called the "spectrum area."

First, the principle of the present invention will be explained.

The cantilever undergoes thermal oscillation at a fixed resonance frequency. When the cantilever undergoing thermal oscillation comes into contact with a soft surface, if that surface has viscosity properties, other oscillation characteristics (for example, spectrum width) change even though the resonance frequency of the cantilever does not change. Therefore, if energy dissipation changes discontinuously according to the difference between noncontact and contact with a surface, it is possible to estimate a contact position accurately from spectral change. That is to say, as noncontact and contact are characterized by the phenomenon itself being discontinuous, when a transition is made from the noncontact state to the contact state, a physical quantity should also change discontinuously in response. Actually, as described later herein, it was confirmed experimentally that the spectrum of thermal oscillation changes discontinuously between noncontact and contact states. Therefore, the spectrum of thermal oscillation can be said to be useful as a physical quantity for determining a contact point. The width of the spectrum in the thermal oscillation basic mode depends on viscosity, with spectrum width increasing as viscosity increases.

Meanwhile, a method whereby forced oscillation of the cantilever is implemented by applying an external field (dynamic, electrical, or magnetic external field) to the cantilever is generally used conventionally. A variety of names are used, such as dynamic mode, tapping mode, AM mode, FM mode, and noncontact mode, all of which basically involve measurement through forced oscillation of the cantilever. With these methods, amplitude change and frequency change at the frequency at which forced oscillation is implemented are measured. At this time, the amplitude of forced oscillation is greater than the amplitude of thermal oscillation, and the energy of forced oscillation is greater than the energy of thermal oscillation. To put it the other way around, the amplitude of thermal oscillation is smaller than the amplitude of forced oscillation, and the energy of thermal oscillation is smaller than the energy of forced oscillation. Therefore, by using thermal oscillation of the cantilever, measurement can be performed with higher sensitivity (that is, more accurately), and less invasively with respect to the sample, than with a conventional method using forced oscillation.

Thus, as to the present invention the difference between noncontact and contact states have been determined from thermal oscillation of the cantilever, without performing forced oscillation.

In this embodiment, time-series data of a deflection signal of a cantilever undergoing thermal oscillation is subjected to FFT (Fast Fourier Transform) processing, and a power spectrum is obtained. Then the power (spectrum area) around the fundamental resonance mode is acquired. The square of fundamental resonance mode resonance A due to thermal oscillation, $<A^2>$, is theoretically $k_B T/k$, where $k_B$, T, and k are the Boltzmann constant, temperature, and spring constant, respectively.

For example, when measuring a cell surface position, a cantilever 5 is lowered from above a single cell 3 attached to a substrate 1 as shown in FIG. 1 and force curve measurement is performed, the amount of flexure and thermal oscillation spectrum area of cantilever 5 are measured, and the cell surface position is evaluated. The amount of flexure of cantilever 5 is measured as a cantilever 5 displacement signal (deflection signal) of the cantilever 5. The area of the spectrum of thermal oscillation (spectrum area) is found by performing FFT processing of the deflection signal (cantilever 5 displacement signal) and acquiring a power spectrum (spectrum of the thermal oscillation), and taking an area of a suitable predetermined range (around the resonance frequency).

Figures 2A, 2B:
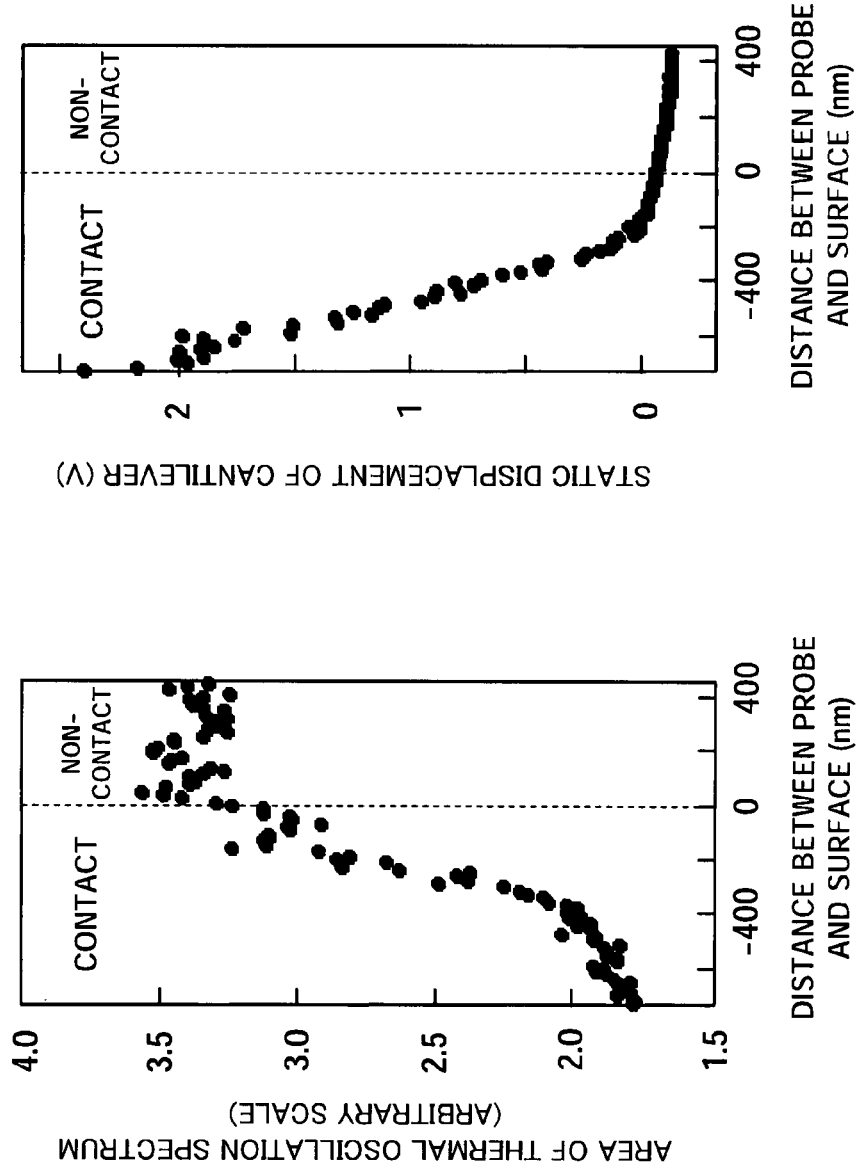
FIG. 2A is a graph showing the distance dependency of the area of the spectrum of thermal oscillation on the proximity of the tip to the cell surface contact position.
FIG. 2B is a graph showing a force curve measured simultaneously with FIG. 2A.

FIG. 2A is a graph showing the distance dependency of the area of the spectrum of thermal oscillation on the proximity to a contact position between the tip and the cell surface, and FIG. 2B is a graph showing a force curve measured simultaneously with FIG. 2A.

As shown in FIG. 2A and FIG. 2B, when the area of the spectrum of thermal oscillation (the spectrum area around the resonance frequency of cantilever 5) and the static displacement (static force) of cantilever 5 are compared, the area of the spectrum of thermal oscillation decreases rapidly from approximately 100 nm before the point at which the static displacement of cantilever 5 begins to increase. This shows that the oscillation spectrum responds sensitively because cantilever 5 energy dissipation occurs due to the mechanical joining of the membrane of single cell 3 and the tip 7 of cantilever 5. For the sake of convenience, in FIG. 2A and FIG. 2B, the point at which the area of the spectrum of thermal oscillation begins to change is set as a reference position (0 nm) with regard to the distance between tip 7 of cantilever 5 and the surface of single cell 3.

In this embodiment, as explained above, force curve measurement widely used with AFMs is performed. However, with normal force curve measurement, deflection, oscillation amplitude, or oscillation frequency is plotted against distance, whereas in this embodiment (a quantity relating to) the spectrum of thermal oscillation is plotted against distance—that is, the power spectrum is measured at each point while varying the distance between the tip and the sample surface. In the experimental examples in FIG. 2A and FIG. 2B, a cantilever with a fundamental mode of approximately 3 kHz in fluid was used, and an area of a suitable range between several 100 Hz and 10 kHz was taken as the spectrum area. A cantilever with a low resonance frequency was used because, from a functional standpoint, it is considered preferable to use as a pliable cantilever as possible (although a cantilever with a high resonance frequency is preferable in terms of measurement speed).

As described above, contact between the tip and the sample surface is thought to involve a change of some physical quantity. With this method, a point at which a change of the power spectrum area occurs is determined to be the position at which the tip starts to come into contact with the sample surface. The horizontal axis in FIG. 2A and FIG. 2B shows the distance between the tip and the sample surface, with a larger value indicating greater separation between the two. In FIG. 2A, the area of the spectrum of thermal oscillation is virtually constant in the area to the right of the dotted line, but to the left of the dotted line the area of the spectrum of thermal oscillation (around the resonance frequency) begins to decrease rapidly. Therefore, the position of the dotted line is the contact position estimated by means of thermal oscillation. In FIG. 2B, on the other hand, it can be seen that change in the static displacement (deflection) of the cantilever does not occur at the position (shown by the dotted line) corresponding to the position at which the area of the spectrum of thermal oscillation begins to change in FIG. 2A, but that static displacement of the cantilever increases rapidly at a position pressed in by approximately a further 100 nm. It can be seen from these results that a surface position measuring method (method for detecting contact position) using thermal oscillation of the cantilever is more sensitive and more accurate than a surface position measuring method using static displacement (deflection) of the cantilever. The slight deflection gradient before the rapid increasing in deflection in FIG. 2B is due to remote interaction between tip 7 and single cell 3.

In FIG. 2A and FIG. 2B, the position at which the area of the spectrum of thermal oscillation begins to change—that is, the position at which the tip starts to come into contact with the sample surface—is taken as the origin on the horizontal axis, but the horizontal axis origin is not, of course, limited to this. Origin of the horizontal axis may be any point at which the tip and the sample are separated.

In this embodiment, a cantilever deflection signal is converted to a spectrum. The reason for this is as follows.

A cantilever deflection signal contains not only data relating to cantilever thermal oscillation but also apparatus and suchlike noise (thermal noise) data, and therefore the SNR (signal-to-noise ratio) will be poor (small) if a deflection signal is used directly for the measurement. Therefore, in this embodiment, change in cantilever thermal oscillation is measured efficiently and accurately by converting a deflection signal to a spectrum and extracting the cantilever resonance mode. When a deflection signal is converted to a spectrum, a square value of amplitude (spectrum values) are obtained for a wide frequency range, and a signal with a good SNR can be obtained by extracting only a frequency component of a predetermined resonance mode range from this spectrum.

Thus, as to the present invention a spectrum of thermal oscillation is measured rapidly while changing the distance between a tip and a sample surface, extracts a fundamental mode component (spectrum area) from the obtained spectrum of thermal oscillation, and determines a contact position by measuring spectrum area change with respect to the distance rapidly (in real time). By this means, a contact position can be determined sensitively even though the conditions are the same as in static mechanical measurement (that is, forced oscillation is not used).

Since, basically, the same method as in normal AFM measurement (imaging) can be used, measurement can be performed in real time. That is to say, in this invention, since an area of the spectrum (X) is kept constant in the noncontact condition, a contact position can be determined in real time by, for example, designating the spectrum area in the noncontact condition as $X_0$; and a predetermined amount of change as $\Delta X$; and setting the value of $X_0$-$\Delta X$ as a threshold value; and taking a point at which the spectrum area reaches the threshold value as a criterion.

Figure 3:
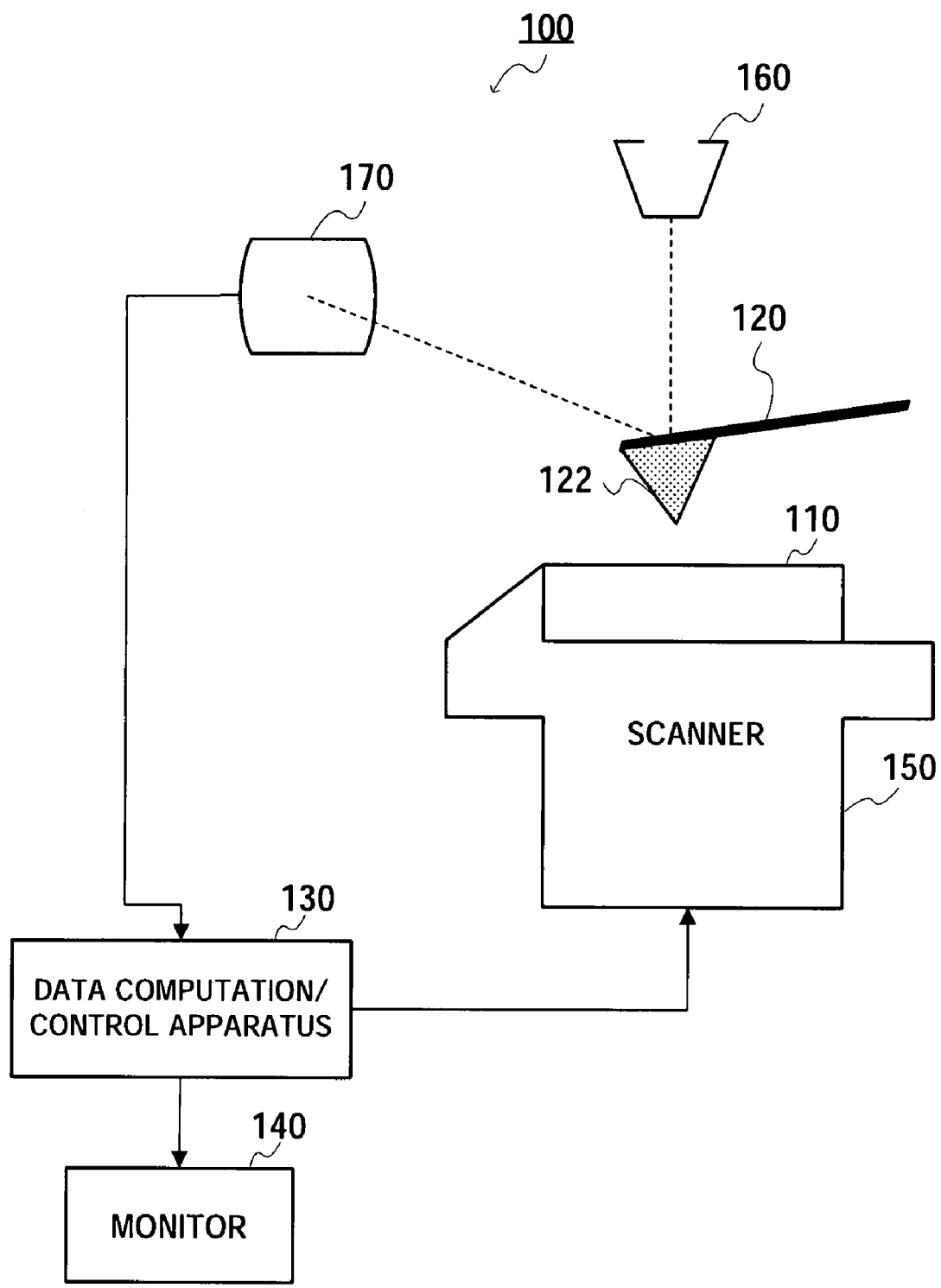
FIG. 3 is a block diagram showing the configuration of a surface position measuring apparatus according to an embodiment of the present invention.

FIG. 3 is a block diagram showing the configuration of a surface position measuring apparatus according to an embodiment of the present invention.

This surface position measuring apparatus 100 can measure a surface position of a soft sample such as a cell based on the above-described principle, and has, for example, a substrate 110, a cantilever 120, a data computation/control apparatus 130, a monitor 140, a scanner 150, a laser apparatus 160, and a photodetector 170. This surface position measuring apparatus 100 is assumed to be an atomic force microscope.

A sample is placed on substrate 110 (see FIG. 1). The sample may be an extremely soft sample such as a cell. Substrate 110 is assumed to be a plane defined by X and Y axes, for example.

Cantilever 120 has a tip 122 with a pointed tip at the end of cantilever. The tip of tip 122 is a contact that comes into contact with the sample surface. In the example shown in FIG. 3, cantilever 120 is fixed.

Data computation/control apparatus 130 controls driving of scanner 150. Specifically, data computation/control apparatus 130 has information detected by photodetector 170 as input, reads the amount of flexure (amount of displacement) of cantilever 120 from the input information, and performs feedback control of scanner 150 drive based on the read amount of flexure (amount of displacement). The configuration of data computation/control apparatus 130 is described later herein.

Monitor 140 displays data sent from data computation/control apparatus 130 on a screen in the form of a graph.

Scanner 150 has substrate 110. Scanner 150 performs a precise 3-dimensional scan of substrate 110 mounted upon it (specifically, moving in the X-axis, Y-axis, and Z-axis directions). Scanner 150 comprises a piezo-electric element, for example. Scanner 150 drive is controlled by data computation/control apparatus 130. By this means, the control of a sample surface scanning (in the X-axis and Y-axis directions) and the distance between the tip and the sample surface (in the Z-axis directions) is performed.

Laser apparatus 160 irradiates the rear surface of the end of cantilever 120 with a laser beam. The laser beam reflected by the rear surface of the end of cantilever 120 is detected by photodetector 170. Photodetector 170 outputs the detected data to data computation/control apparatus 130. That is to say, the flexure (displacement) of cantilever 120 is obtained by detecting a change in the angle of reflection of the laser beam from the rear surface of the end of the lever by means of photodetector 170. In FIG. 3, the laser beam is indicated by a dotted line.

Figure 4:
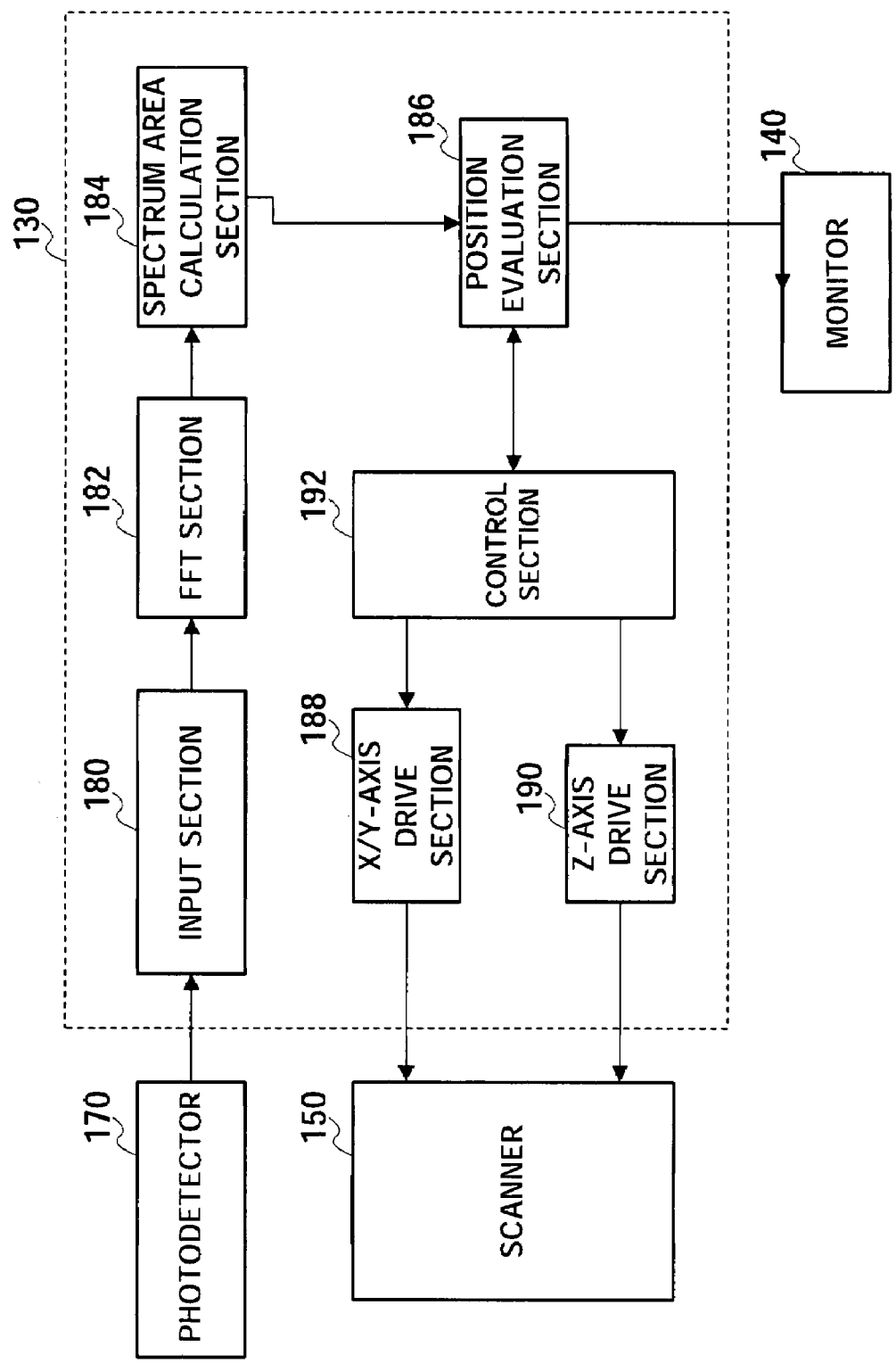
FIG. 4 is a block diagram showing an example of the configuration of the data computation/control apparatus in FIG. 3.

FIG. 4 is a block diagram showing an example of the configuration of data computation/control apparatus 130.

Data computation/control apparatus 130 comprises a computer, for example, and has a function of automatically measuring a surface position of a sample on substrate 110 according to a predefined program. Data computation/control apparatus 130 has, for example, an input section 180, an FFT section 182, a spectrum area calculation section 184, a position evaluation section 186, an X/Y-axis drive section 188, a Z-axis drive section 190, and a control section 192.

For each controlled distance between the tip and the sample surface (that is, Z-axis direction position) input section 180 performs input processing of information detected by photodetector 170 as a cantilever 120 displacement signal (deflection signal). A deflection signal that has undergone input processing is output to FFT section 182.

FFT section 182 performs FFT processing on a deflection signal from input section 180, and acquires a power spectrum (spectrum of thermal oscillation). The obtained spectrum data of thermal oscillation is output to spectrum area calculation section 184.

Spectrum area calculation section 184 takes spectrum data of thermal oscillation from FFT section 182 as input, and calculates the area of the spectrum of thermal oscillation (spectrum area) of cantilever 120 by extracting only a resonance mode frequency component in a predetermined range from the input spectrum of thermal oscillation—that is, finding the area around the resonance frequency in a predetermined range. Obtained spectrum area data is output to position evaluation section 186.

Using spectrum area data from spectrum area calculation section 184 and data as to the distance between the tip and the sample surface from control section 192, and a set of past such data, position evaluation section 186 evaluates a sample surface position based on the above-described calculation principle. Specifically, as described above, a position (in the Z-axis direction) at which the area of the spectrum of thermal oscillation begins to change is evaluated as the position at which tip 122 starts to come into contact with the sample surface—that is, the sample surface position (see FIG. 2A). The data used for evaluation by position evaluation section 186 is output to monitor 140 in a form that can be displayed as a graph.

X/Y-axis drive section 188 outputs a signal that drives the X-axis and Y-axis of scanner 150. On receiving input of this drive signal, scanner 150 scans the sample surface in the X-axis and Y-axis directions. The initial position is set to a suitable position beforehand.

Z-axis drive section 190 outputs a signal that drives the Z-axis of scanner 150. On receiving input of this drive signal, scanner 150 starts scanning on the sample surface in the Z-axis direction. That is to say, the distance between tip 122 of cantilever 120 and the surface of the sample on substrate 110 is controlled by means of this drive signal. The reason for this is that in this embodiment, as explained above, cantilever 120 is fixed, and therefore the relevant distance between tip 122 and the sample surface is changed by driving scanner 150 in the Z-axis direction. The initial position is set to a suitable position at which tip 122 and the sample surface are separated.

Control section 192 ascertains the 3-dimensional current position (that is, the sample surface X/Y-axis direction position and Z-axis direction position) of scanner 150, and performs feedback control of scanner 150 drive based on the sample surface position information evaluated by position evaluation section 186.

Figure 5:
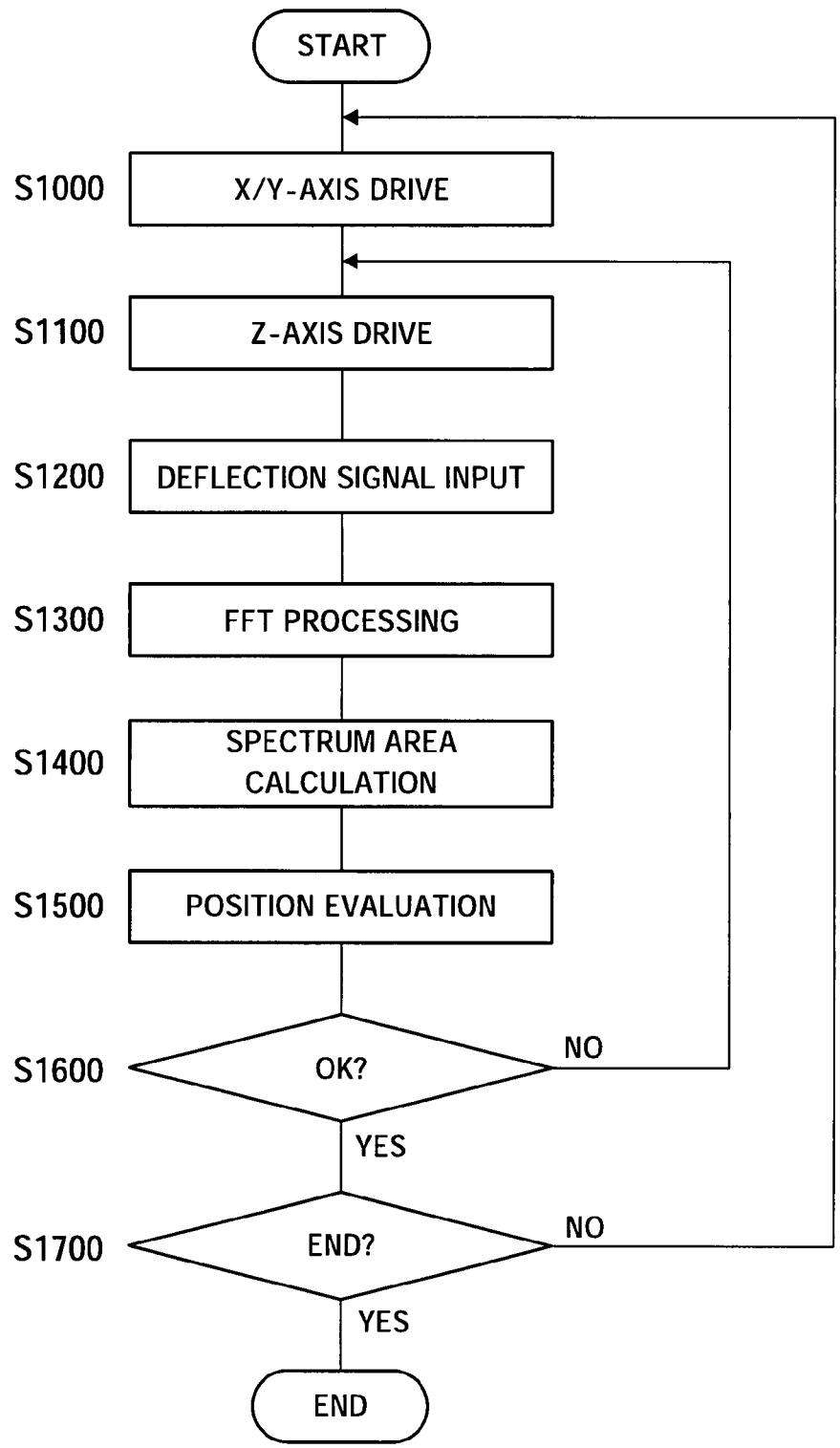
FIG. 5 is a flowchart showing a measurement operation of a surface position measuring apparatus according to an embodiment of the present invention.

An operation for measuring a surface position by apparatus for measuring surface position 100 having the above configuration will now be explained using the flowchart shown in FIG. 5. The description mainly focuses on the operation of data computation/control apparatus 130. The flowchart shown in FIG. 5 is stored as a control program in a storage apparatus (ROM or the like, not shown) of data computation/control apparatus 130, and is executed by a CPU (not shown).

First, in step S1000, X/Y-axis drive section 188 drives scanner 150 in the X-axis and Y-axis directions, and the sample surface is scanned in the X-axis and Y-axis directions.

Then, in step S1100, Z-axis drive section 190 drives scanner 150 in the Z-axis direction, and controls the distance between tip 122 and the sample surface.

In step S1200, input section 180 performs input processing of information detected by photodetector 170 as a cantilever 120 displacement signal (deflection signal) according to the distance between the tip and sample surface controlled in step S1100.

In step S1300, FFT section 182 performs FFT processing of the deflection signal subjected to input processing in step S1200, and acquires a power spectrum (spectrum of thermal oscillation).

In step S1400, spectrum area calculation section 184 takes the spectrum of thermal oscillation acquired in step S1300 as input, and calculates the area of the spectrum of thermal oscillation (spectrum area) of cantilever 120 by extracting only a resonance mode frequency component in a predetermined range from the input spectrum of thermal oscillation.

In step S1500, position evaluation section 186 evaluates a sample surface position using the spectrum area calculated in step S1400 and the distance between the tip and sample surface controlled in step S1100, and a set of past such data. Specifically, a position (in the Z-axis direction) at which the area of the spectrum of thermal oscillation begins to change is evaluated as the sample surface position.

In step S1600, it is determined whether or not the step S1500 evaluation result is OK—that is, whether or not it has been possible to detect the sample surface position. If the result of this determination is that it has been possible to detect the sample surface position (S1600: YES), the processing flow proceeds to step S1700, whereas if it has not been possible to detect the sample surface position (S1600: NO), the processing flow returns to step S1100, tip 122 is brought closer to the sample, and the same kind of measurement is performed.

In step S1700, it is determined whether or not surface position measurement for the sample has finished. Specifically, an X/Y-axis direction scanning range is set beforehand, and it is determined whether or not scanning has been completed for that scanning range. If the result of this determination is that surface position measurement has finished (S1700: YES), the series of processing steps is terminated, whereas if surface position measurement has not finished (S1700: NO), the processing flow returns to step S1000, the sample surface is scanned in the X-axis and Y-axis directions, and the same kind of measurement is performed.

Thus, according to this embodiment, a sample surface position is measured using thermal oscillation of the cantilever, enabling a position of a soft surface to be measured accurately and rapidly (in real time), in a minimally invasive manner.

Therefore, an accurate image of a sample surface can be obtained (accurate surface imaging can be performed) by using a feedback signal so that the shape of a measured spectrum of thermal oscillation is constant.

Also, by applying feedback so that the shape of a spectrum of thermal oscillation is constant, interaction between the tip and a surface can be measured accurately.

Furthermore, since a cell surface position can be measured accurately, an object attached to the tip can be inserted into a cell or the like. Moreover, an external field applied to a cell can be controlled accurately. Also, a property relating to cell surface fluctuation can be measured (subjected to spectral analysis) in a minimally invasive manner.

In this embodiment, the method of finding the area of a spectrum of thermal oscillation has included steps of measuring a spectrum of thermal oscillation, and taking an area in a suitable predetermined range (around the resonance frequency). However the method is not limited to this. For example, it is also possible to use a signal that performs bandpass filtering (in the vicinity of the resonance frequency) on a cantilever deflection signal.

In this embodiment, the periphery of the basic mode frequency is extracted in finding the area of a spectrum of thermal oscillation, but the present invention is not limited to this, and it is also possible to select or include a high-order harmonic component. Selecting or including a high-order harmonic component enables the measurement to be performed with still higher sensitivity. This is because, while a basic mode or high-order mode appears in a spectrum of thermal oscillation, it is thought that change due to the tip coming into contact with a sample surface also appears in the case of a high-order mode.

In this embodiment, the amplitude of thermal oscillation is measured, but the present invention is not limited to this, and a method can include steps of performing feedback that suppresses thermal oscillation (by means of a light pressure or suchlike method), and measuring the feed back signal. Specifically, an optical lever method is generally used for measurement of cantilever displacement, and varying the light intensity in an optical lever method changes the light radiation pressure exerted on the cantilever, by which means the amplitude of cantilever thermal oscillation can be controlled. At this time, it is also possible to stop cantilever thermal oscillation completely, in such a case light intensity variation will be equivalent to cantilever thermal oscillation.

In this embodiment, a sample on substrate 110 is moved 3-dimensionally by driving scanner 150 alone in the X-axis, Y-axis, and Z-axis directions, but the present invention is not limited to this. For example, a configuration is also possible whereby X, Y, and Z axes that finely adjust the position of the cantilever are moved together with the scanner. Furthermore, it is also possible to move the scanner in the X-axis and Y-axis directions and to move the cantilever in the Z-axis direction.

In this embodiment, a case has been described by way of example in which surface position measurement processing is performed by means of program (software) control, but the present invention is not limited to this, and it is also possible to configure part or all of the data computation/control apparatus by means of electronic circuitry, and to implement part or all of the measurement processing by means of hardware control.

The present application is based on Japanese Patent Application No. 2005-001538 filed on Jan. 6, 2005, entire content of which is expressly incorporated herein by reference.

INDUSTRIAL APPLICABILITY

A surface position measuring method and surface position measuring apparatus according to the present invention are useful as a surface position measuring method and surface position measuring apparatus capable of measuring a position of a soft surface accurately and rapidly (in real time), in a minimally invasive manner.

More particularly, the present invention is suitable for an extremely soft sample such as a cell—that is, a sample that is fragile and changes greatly in shape.

The invention claimed is:

1. A surface position measuring method comprising:
   a detection step of detecting an area of a spectrum of unforced thermal oscillation of a cantilever having a probe; and
   an evaluation step of evaluating a position of a sample surface from a contact position between the probe and the sample surface measured based on change of the detected area of the spectrum of unforced thermal oscillation of the cantilever.

2. The surface position measuring method according to claim 1, wherein the evaluation step measures a position at which the detected area of the spectrum of unforced thermal oscillation of the cantilever starts to change responsive to the contact position between the probe and the sample surface.

3. The surface position measuring method according to claim 2, wherein:
   the detection step comprises:
   a step of detecting a displacement signal of the cantilever having the probe;
   a step of performing FFT processing of the detected displacement signal to acquire the spectrum of unforced thermal oscillation; and
   a step of extracting a cantilever resonance mode part from the acquired spectrum of unforced thermal oscillation and calculating an area of the spectrum of unforced thermal oscillation around a resonance frequency of the cantilever, and
   the evaluation step measures a position at which the detected area of the spectrum of unforced thermal oscillation of the cantilever starts to change responsive to the contact position between the probe and the sample surface.

4. The surface position measuring method according to claim 1, further comprising rapidly measuring the spectrum of thermal oscillation while changing the distance between a tip and a sample surface, thereby extracting a fundamental mode component from the area of the spectrum of thermal oscillation, and determining the contact position by measuring spectrum area change with respect to the distance in real time, thereby permitting determining the contact position without use of forced oscillation.

5. A surface position measuring apparatus comprising:
   a detection section that detects an area of a spectrum of unforced thermal oscillation of a cantilever having a probe; and
   an evaluation section that evaluates a position of a sample surface from a contact position between the probe and the sample surface measured based on change of the area of the spectrum of unforced thermal oscillation of the cantilever detected by the detection section.

6. The surface position measuring apparatus according to claim 5, further comprising the apparatus rapidly measuring the spectrum of thermal oscillation while changing the distance between a tip and a sample surface, thereby extracting a fundamental mode component from the area of the spectrum of thermal oscillation, and determining the contact position by measuring spectrum area change with respect to the distance in real time, thereby permitting determining the contact position without use of forced oscillation.

* * * * *